United States Patent [19]
Godeau

[11] Patent Number: 5,421,622
[45] Date of Patent: Jun. 6, 1995

[54] RAPID-ACTION COUPLING DEVICE FOR PROVIDING A SEALED CONNECTION BETWEEN TWO RIGID OR SEMI-RIGID TUBES OR PIPES

[75] Inventor: Denis Godeau, Vieilles, France
[73] Assignee: Hutchinson, Paris, France
[21] Appl. No.: 991,943
[22] Filed: Dec. 17, 1992
[30] Foreign Application Priority Data
Dec. 18, 1991 [FR] France ............................ 91 15709
[51] Int. Cl.⁶ .................................................. F16L 39/00
[52] U.S. Cl. ....................................... 285/319; 285/921; 285/910; 285/351
[58] Field of Search ................ 285/319, 308, 347, 374, 285/910, 921, 231, 232, 351

[56] References Cited
U.S. PATENT DOCUMENTS

| | | | |
|---|---|---|---|
| 517,192 | 3/1894 | Prior | 285/347 X |
| 3,015,510 | 1/1962 | Bates | 288/23 |
| 3,711,125 | 1/1973 | Dehar | 285/319 X |
| 4,067,534 | 1/1978 | Frey | 285/319 |
| 4,781,400 | 11/1988 | Cunningham | 285/39 |
| 4,979,765 | 12/1990 | Bartholomew | 285/308 X |
| 5,069,424 | 12/1991 | Dennany, Jr. et al. | 251/149.6 |
| 5,106,127 | 4/1992 | Briet | 285/921 X |
| 5,226,679 | 7/1993 | Klinger | 285/319 X |

FOREIGN PATENT DOCUMENTS

| | | |
|---|---|---|
| 0060309 | 9/1982 | European Pat. Off. . |
| 0306126 | 3/1989 | European Pat. Off. . |
| 1540896 | 9/1968 | France . |
| 8522062.0 | 12/1986 | Germany . |
| 3239891 | 10/1991 | Japan ................ 285/319 |

Primary Examiner—Dave W. Arola
Attorney, Agent, or Firm—Jacobson, Price, Holman & Stern

[57] ABSTRACT

A rapid-action coupling device for making a sealed connection between two rigid or semi-rigid tubes or pipes includes a gasket constituted by a sleeve having latching means at one of its ends for co-operating with spring blades fixed on a tube or pipe, the spring blades including latching means suitable for co-operating with the outside surface or with a collar on the other tube or pipe.

13 Claims, 4 Drawing Sheets

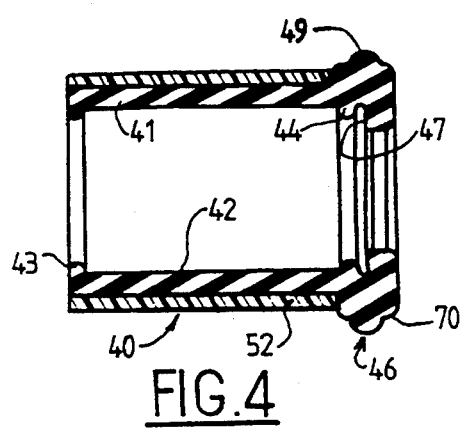
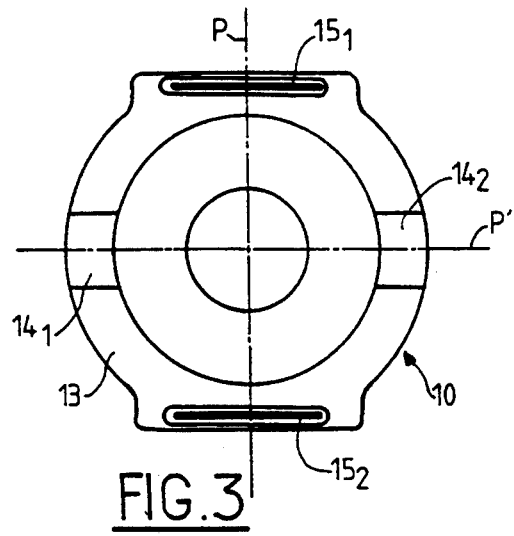
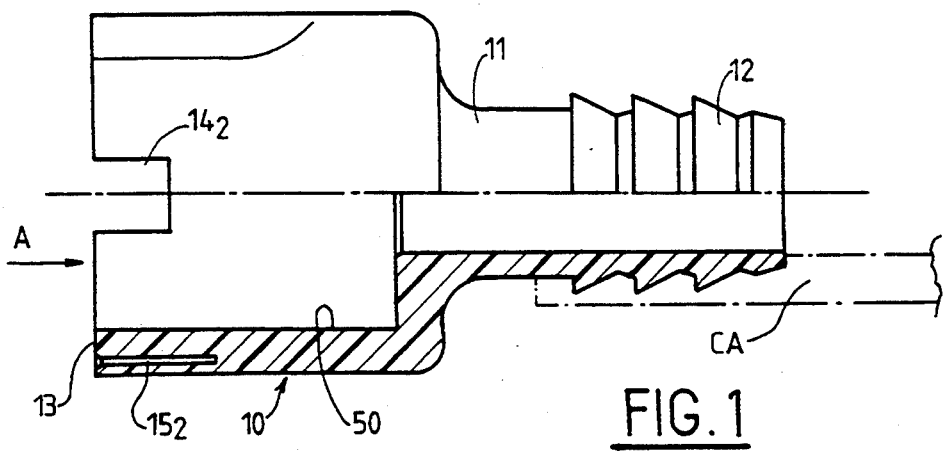
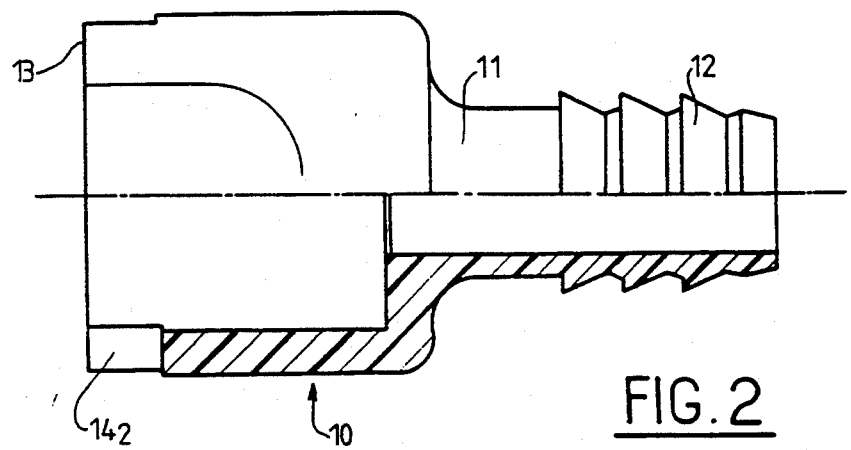

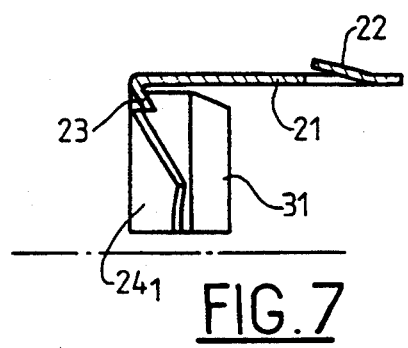
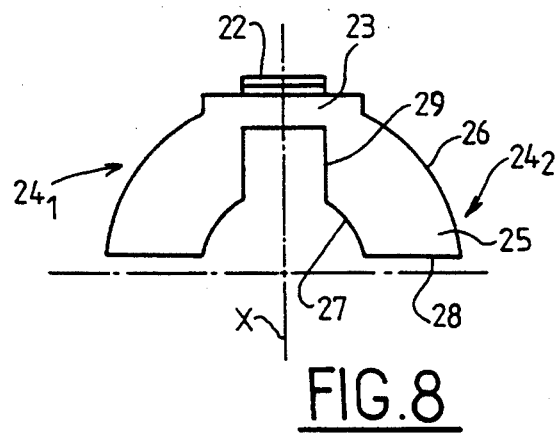
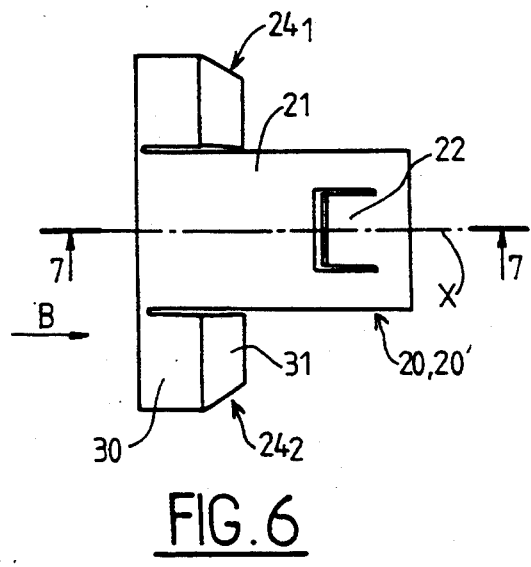
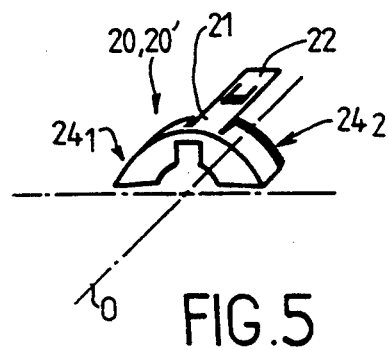
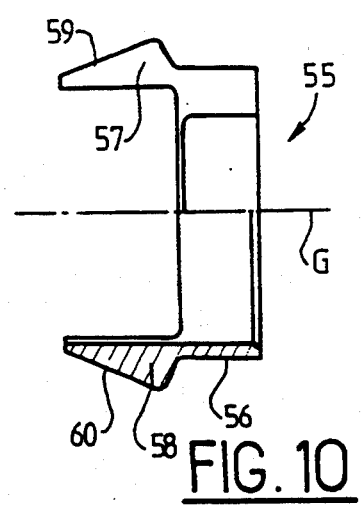
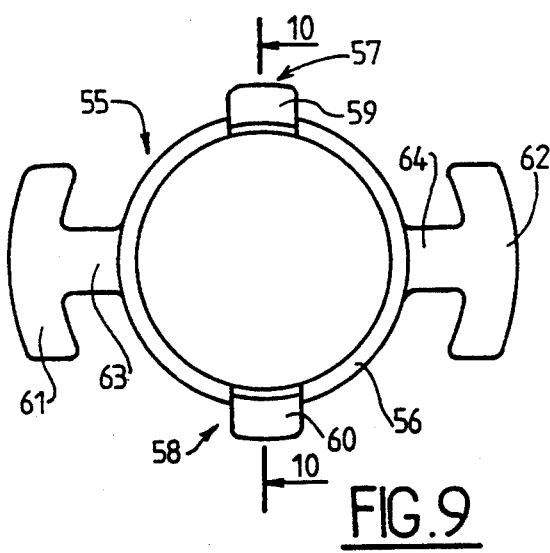

RAPID-ACTION COUPLING DEVICE FOR PROVIDING A SEALED CONNECTION BETWEEN TWO RIGID OR SEMI-RIGID TUBES OR PIPES

The invention relates to a rapid-action coupling device for providing a sealed connection between two rigid or semi-rigid tubes or pipes.

BACKGROUND OF THE INVENTION

The problem of providing a sealed connection between two tubes or pipes, at least one of which is rigid or semi-rigid, e.g. is made of metal or of plastic, has already received a wide range of solutions that differ, in particular, by the presence or the absence of a gasket. Thus, when one of the elements of the coupling is made of a flexible material, such as rubber, a gasket is unnecessary (see EP-A1-0 401 083), whereas in couplings where both of the elements to be assembled together are rigid or semi-rigid, a gasket is interposed between said elements, as shown in FR-A-2 628 819 or FR-A-2 632 707, for example, where FR-A-2 632 707 is in the name of the Assignee. In spite of the solutions that have already been proposed, a need continues to exist in industry, and in particular in the motor industry, for a coupling to connect together two rigid or semi-rigid tubes or pipes in such a manner as to make it possible to establish a connection that is not only quick, simple, and reliable, but that is also proof against the fluid conveyed thereby, be it a liquid (water, oil, gasoline), or a gas such as air, and this should apply to couplings that are releasable or not, as the case may be.

Consequently, a general object of the invention is to provide a rapid-action coupling device which enables the above results to be obtained.

Another object of the invention is to provide such a rapid-action coupling device having characteristics, and in particular sealing characteristics, that are maintained over time.

Another object of the invention is to provide such a device enabling different types of tubes or pipes to be coupled together, for example pipes made of plastic or tubes made of steel and having a collar, the coupling being releasable or not as the case may be, depending on practical requirements.

Yet another object of the invention is to provide such a device that makes it easy to monitor the connection it serves to establish, and that is also extremely simple to maintain when it provides a releasable coupling, thereby providing considerable advantages in after-sales service, particularly in its application to the motor industry.

SUMMARY OF THE INVENTION

The present invention provides a rapid-action coupling device for a sealed connection between two rigid or semi-rigid tubes or pipes, the device comprising a gasket interposed between said tubes or pipes when the free end of a first one of them is inserted in the second, the gasket being disposed coaxially therebetween, wherein said gasket is constituted by a sleeve having an annular flange formed on its outside surface at one of its ends to constitute a sealing rim and has an inside face which is suitable for co-operating with the edge of said tube or pipe on which the gasket is held spring blades being fixed on the second tube or pipe to provide locking means suitable for co-operating with the outside surface or a collar of said first tube or pipe so as to oppose involuntary separation of the two tubes or pipes after they have been coupled together at the end of a sliding movement of one within the other.

According to another feature of the invention, the gasket is guided and held on the first tube or pipe by spaced-apart rings that are formed on the inside cylindrical surface of the sleeve, preferably in the vicinity of each of its two ends.

The rings are preferably spaced apart by a distance greater than the diameter of the first tube or pipe with which they co-operate (in order to ensure satisfactory guidance of the gasket over said tube or pipe), and they should also be dimensioned in such a manner such that the ring closest to the annular end collar of the gasket provides greater resistance to engaging the first tube or pipe than does the other ring.

According to another feature of the invention, the sealing collar formed on the outside surface of the sleeve of the gasket is dimensioned in such a manner that it offers greater resistance to displacement in the second tube or pipe than the resistance provided by the rings to displacement of the first tube or pipe inside the gasket, thereby ensuring that the gasket does not slide inside said second tube or pipe until it is totally engaged on the first tube or pipe.

Also in accordance with the invention, a bush for serving as an assembly indicator may be associated with the sleeve of the gasket.

In a particular embodiment, the device further includes a ring for enabling the coupling to be disassembled after it has been assembled, said ring (which is provided with grasping lugs to make it easy to actuate by a user) being interposed between the bush and said second tube or pipe.

The invention also provides a sealing gasket suitable for use in a coupling device as defined above, wherein the gasket includes a cylindrical sleeve whose inside surface has two rings in the vicinity of respective ones of its two ends, which rings are spaced apart from each other, one of said rings being adjacent to an annular flange whose outside surface provides a sealing rim suitable for co-operating with the inside surface of a first one of said tubes or pipes of the coupling device, and whose inside surface is shaped so as to provide an abutment face which is suitable for co-operating with the edge of the free edge at the end of the other one of said tubes or pipes.

BRIEF DESCRIPTION OF THE DRAWINGS

An embodiment of the invention is described by way of example with reference to the accompanying drawings, in which:

FIG. 1 is a view partly in elevation and partly in longitudinal section through an element of the coupling device of the invention;

FIG. 2 is a view of the same element, partly in section and partly in elevation, on a plane at 90° to FIG. 1;

FIG. 3 is an end view as seen along arrow A in FIG. 1.

FIG. 4 is a longitudinal section view through a gasket and a bush of the device of the invention prior to assembly;

FIG. 5 is a diagrammatic perspective view of a spring blade forming a portion of a device of the invention;

FIG. 6 is an elevation view of the spring blade as seen from above, and on a larger scale;

FIG. 7 is a half-section on line 7—7 of FIG. 6;

FIG. 8 is an end view as seen looking along arrow B of FIG. 6;

FIG. 9 is an end view of an unlocking ring;

FIG. 10 is a view of said unlocking ring, partially in elevation and partially in section on line 10—10 of FIG. 9;

DETAILED DESCRIPTION

Figure 11:
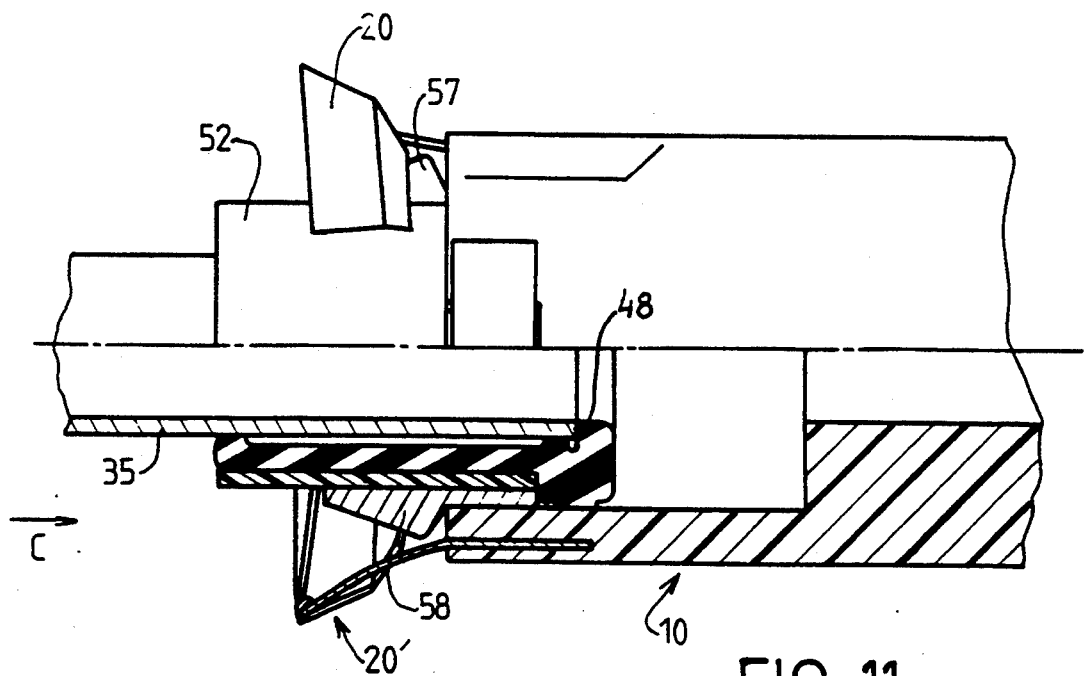
FIG. 11 is a view partially in elevation and partially in longitudinal section through a device of the invention while coupling is taking place.
Figure 12:
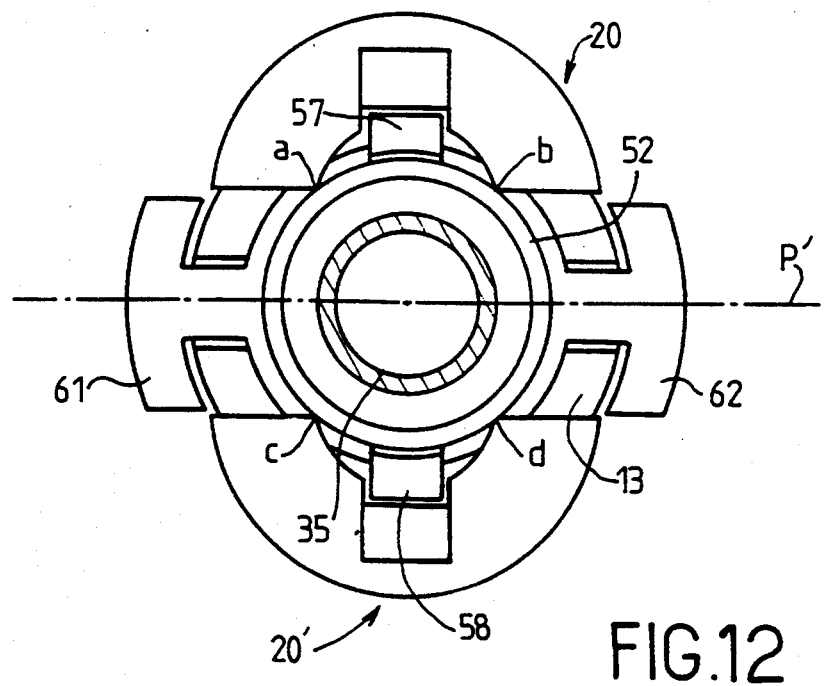
FIG. 12 is an end view of the device while coupling is taking place, and as seen along arrow C in FIG. 11.

Reference is first made to FIGS. 1 to 14 which show a rapid-action coupling device of the invention for semi-rigid tubes or pipes, and in particular for tubes or pipes made of plastic and designed to be used in the motor industry, e.g. as component parts in a circuit for water, gasoline, oil, or air. The device comprises a tubular element 10 which, in the embodiment described and shown, forms the end of an endpiece 11 provided with serrated ribs 12 for the purpose of fixing it by means not shown to a flexible hose CA, e.g. made of rubber or like material. On the front end face 13 of the tubular element 10, which is cut out at two diametrically opposite notches $14_1$ and $14_2$, two diametrically opposite slots $15_1$ and $15_2$ open out, said slots having a mean plane of symmetry P which is perpendicular to the mean plane of symmetrical P' of the notches $14_1$ and $14_2$. A resilient blade 20 or 20' is received in each of the slots 15 (FIGS. 5 to 8), the blade being constituted by a substantially rectangular body 21 from which a tongue 22 is cut out that is initially deflected so as to project relative to the plane of said body, thereby securing said resilient spring blade to the tubular element 10 after the body 21 has been installed in a slot 15. At its end opposite to the end carrying the tongue 22, the body 21 is folded to form a fascia 23 of generally rectangular outline which slopes relative to the plane of the body 21 (FIG. 7) and which carries two skirts $24_1$ and $24_2$ at its respective longitudinal ends, which skirts are symmetrical about a mean longitudinal plane X of the blade 20. As shown clearly in FIGS. 5 to 8, each skirt 24 comprises:

a front face 25 delimited by two concentric circular arcs 26 and 27 and by two radially-extending edges 28 and 29, with the edge 29 being parallel to the plane X;

a substantially cylindrical surface 30 about an axis O that coincides with the axis F of the tubular element 10 when the spring blade 20 is mounted thereon and which joins the front face 25 via the arc 26; and a surface 31 that is partially frustoconical and which extends the substantially cylindrical surface 30 going away from the front face 25.

The spring blades 20 and 20' which are symmetrical about the plane P' when secured to the tubular element 10 by being inserted in respective slots $15_1$ and $15_2$ (FIGS. 11 to 14) are designed to co-operate with the other element of the coupling of the invention, e.g. a tube 35 made of plastic, when said other element is inserted into the tubular element 10, after it has been fitted with a sealing gasket 40 (FIG. 4).

The gasket is constituted by a cylindrical sleeve 41 of elastomer material, such as rubber having a hardness on the Shore scale of about 70; it is provided on its inside surface 42 and, in the vicinity of each of its two ends, with respective rings 43 and 44 suitable for co-operating with the outside surface 45 of the tube 35 on which said gasket is fitted and secured before the coupling is used, where the rings 43 and 44 are spaced apart by a distance that is greater than the diameter of the tube 35 and are dimensioned so that after the tube and the gasket have been assembled together, the ring 44 is more compressed than the ring 43, in other words it provides greater resistance to the tube being engaged in the gasket than does the ring 43. At the end of the sleeve 41 adjacent to the ring 44, the gasket 40 has an annular flange 46 which provides an internal face 47 suitable for co-operating with the end edge 48 of the tube 35 and which has an outside surface that is shaped to form a rim 49 suitable for co-operating in sealing manner with the largest diameter inside surface 50 of the tubular element 10. The flange 46 is shaped and dimensioned in such a manner as to offer greater resistance to movement within the tubular element 10 than the resistance offered by the rings 43 and 44 to displacement of the tube 35 such that as explained below, the gasket 40 can slide in the tubular element 10 only after it has been fully engaged on the tube 35 when the two component elements of the coupling device are brought together.

A bush 52 is fixed on the sleeve 41 of the gasket 40, which gasket has a length equal to two to three times the diameter of the tube 35 so as to ensure that the tube is properly guided in the gasket, which bush 52 is intended to serve as a marker to show when the coupling has been coupled together, the bush may be over-molded on the sleeve 41 if it is made of plastic or it may be fitted thereover if it is made of metal.

The coupling may optionally be releasable at will, depending on whether or not an uncoupling ring 55 (FIGS. 9 and 10) is present, which uncoupling ring is advantageously made of plastic and comprises a barrel 56 extended in the direction of its axis G by two tabs 57 and 58 of substantially triangular right section so as to define two faces 59 and 60 that form respective ramps that slope relative to the outside surface of the barrel 56. Two lugs 61 and 62 for grasping are also formed on the barrel and are disposed in a plane that is perpendicular to the mean plane of the tabs 57 and 58 and the webs 63 and 64 that connect said lugs respectively to the barrel are of a width that corresponds to the notches $14_1$ and $14_2$ of the tubular element 10, so they can be received therein.

To couple together the elements of the rapid-action coupling device of the invention, the gasket 40 is initially placed on the tube 35 until its edge 48 comes into abutment against the face 47 of the flange 46, with the rings 43 and 44 providing guidance, sealing, and fixing of the gasket on the tube. Fitted with the gasket, the tube is then inserted into the tubular element 10 which has previously been fitted with the uncoupling ring 55 if the coupling is to be of the releasable type. When the assembly comprising the tube 35 and the gasket 40 begins to be inserted in the tubular element 10, which insertion is facilitated by the front face 70 having a right section that constitutes one-fourth of a circle because of the flange 46 (FIG. 4), the device takes up the condition shown in FIGS. 11 and 12, where the spring blades 20 and 20' are moved apart from each other perpendicularly to the mean diametral plane P', taking advantage of the resilience of the bodies 21 of said spring blades. As the assembly comprising the tube and the gasket continues to move in the direction of arrow C in FIG. 11, said spring blades co-operate with the bush 52 only in point-like contact zones a, b, c, and d (FIG. 12) of their front edges 28 and 29, such that the sliding movement of the tube and gasket assembly into the tubular element 10 takes place without difficulty, and with the flange 46 being compressed such that at the end of the movement it is more compressed than the ring 44 which is in turn more compressed than the ring 43.

Figure 13:
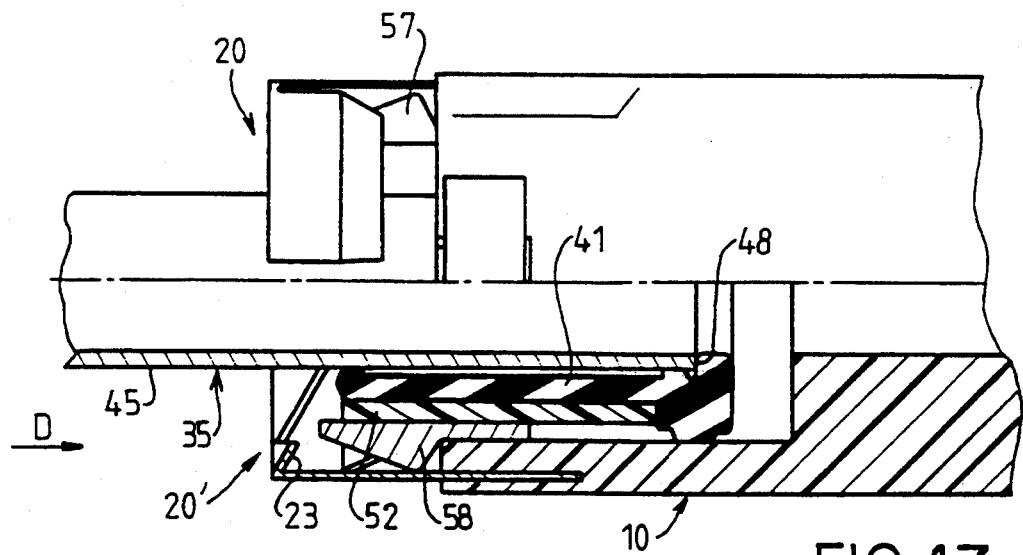
FIG. 13 is a view partially in elevation and partially in longitudinal section through the device once coupled.
Figure 14:
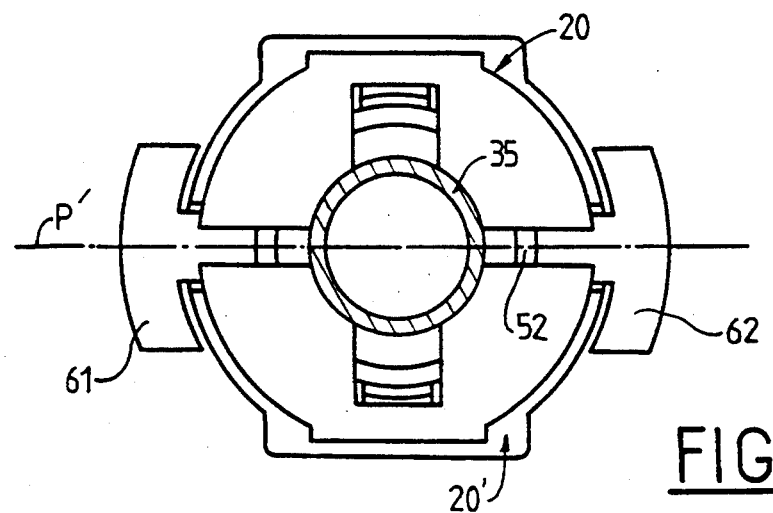
FIG. 14 is an end view of the coupled device as seen along arrow D in FIG. 13.

As soon as the bush 52 no longer faces the free edges of the skirts 24 of the spring blades 20 and 20', they return to their non-stress position and the condition is that shown in FIGS. 13 and 14, with the skirts 24 co-operating with the outside surface of the tube 35 against which they bear with a buttressing effect that makes it difficult for the coupling device to come apart unexpectedly.

If the coupling is to be releasable, e.g. for after-sales maintenance, then an operator merely needs to grasp the lugs 61 and 62 of the ring 55 and to displace said ring in the opposite direction to that marked by arrow D in FIG. 13. During such displacement, the sloping ramps 59 and 60 of the tabs 57 and 58 come into contact with the fascia 23 of the spring blades 20 and 20', thereby bending them outwards relative to the device and thus counteracting the locking means constituted by the skirts 24, and as a result making it possible to extract the tube and gasket assembly from the tubular element 10.

When the coupling is to be permanent, it is implemented in a manner identical to that described above except that the ring 55 is merely a tubular barrel without tabs, such as 57 or 58, or lugs, such as 61 or 62, assuming that such a ring is used at all, or else it is completely omitted and the indicator bush 52 is thicker.

Figure 15:
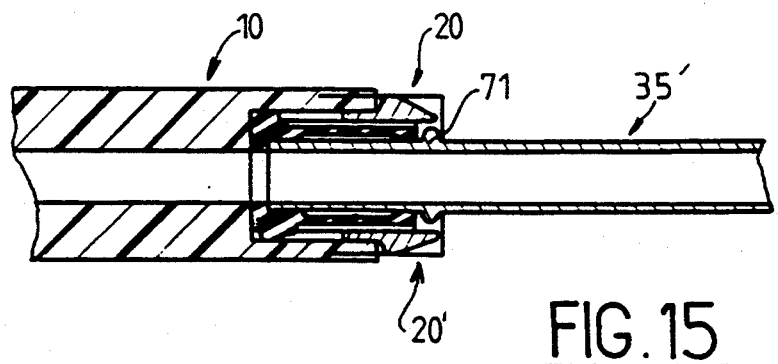
FIG. 15 is a section view on a smaller scale through a coupled device in which one of the elements is a metal tube having a collar.

The same technique is used for the device shown in FIG. 15 where the tube 35' is a metal tube having a collar 71 onto which the spring blades 20 and 20' secured to the portion 10 of the coupling device come into engagement at the end of a coupling stroke.

Regardless of the particular embodiment, the rapid-action coupling device of the invention provides excellent connection between the elements of the coupling because of the two regions of sealing provided by the gasket 40, and it provides good behavior in operation firstly because of the relatively long lengthwise guidance applied to the tubes or pipes of the coupling and secondly because of the locking which takes place by means of the spring blades 20 and 20' outside the sealing zone.

In addition, the bush 52 (whose position relative to the spring blades is immediately visible) informs the user in a simple manner as to whether or not the elements have been properly coupled together, and the optional presence of the uncoupling ring which is easily accessible from outside the coupling makes it possible, should that be necessary, to greatly facilitate maintenance, e.g. for the purpose of changing a gasket.

I claim:

1. A rapid-action coupling device for a sealed connection between two, a first and a second, at least semi-rigid tubes or pipes, the device comprising a gasket disposed coaxially and held in direct contact with and between said tubes or pipes when a free end of the first tube or pipe is inserted into a free end of the second tube or pipe;

said gasket comprising a cylindrical sleeve, having an outside surface, an inside face and two ends, and having an annular flange formed on the outside surface at one of the ends to constitute a sealing rim; the inside face being suitable for cooperating with an edge of said tube or pipe on which the gasket is held; and spring blades, fixed on the second tube or pipe, which provide locking means for opposing involuntary separation of the two tubes or pipes after they have been coupled together at the end of a sliding movement of the first within the second;

the cylindrical sleeve being provided on its inside cylindrical surface and in the vicinity of its two ends with rings that are spaced apart from each other and that are suitable for co-operating with the outside surface of said first tube or pipe for guiding and holding it on said gasket;

the rings being spaced apart by a distance that is greater than the diameter of the first tube or pipe, and being dimensioned so that one of the rings, which is closer to the annular flange, provides greater resistance to engagement on the first tube or pipe than the resistance provided by the other ring.

2. A rapid-action coupling device according to claim 1, wherein bush means, bush means for servings as an indicator of coupling are in direct contact with the sleeve of the gasket.

3. A rapid-coupling device according to claim 2, further including an uncoupling ring, said ring which is provided with grasping lugs to enable it to be actuated by a user, being interposed between the bush and said second tube or pipe.

4. A rapid-action coupling device according to claim 3, wherein the spring blades have respective fascias and the uncoupling ring includes tabs having inclined ramps suitable for co-operating with the respective fascias of the spring blades so as to move the locking means included in said spring blades apart from the tube or pipe with which they co-operate after coupling has taken place.

5. A rapid-action coupling device according to claim 1, wherein the tubes or pipes are rigid tubes or pipes.

6. A rapid-action coupling device according to claim 1, wherein the locking means are suitable for co-operating with the outside surface of said first tube or pipe.

7. A rapid-action coupling device according to claim 1 wherein said first tube or pipe has a collar.

8. A rapid-action coupling device according to claim 1, wherein the locking means are suitable for co-operating with the collar of the first tube or pipe.

9. A gasket suitable for use in a rapid-action coupling device for coupling a first tube or pipe with a second tube or pipe, the first tube or pipe having a free end and a smaller diameter than the second tube or pipe, the gasket including a cylindrical sleeve having two ends, an inside surface with an abutment face, two rings on the inside surface, an outside surface and an annular flange at one end of the gasket sleeve, each of the two rings being on the inside surface in the vicinity of a different one of the respective two ends, which rings are spaced apart from each other, one of said rings being adjacent to the annular flange;

the annular flange having an outside surface which protrudes outwardly from the outside surface of the gasket sleeve and provides a sealing rim suitable for cooperating with the inside surface of the second tube or pipe, and having an inside surface shaped so as to provide the abutment face which is suitable for cooperating with an edge of the free end of the first tube or pipe.

10. A gasket according to claim 9, wherein:

the rings are spaced apart from each other by a distance greater than the diameter of the first tube or pipe;

said rings are shaped and dimensioned in such a manner that the ring closer to the annular flange provides greater resistance to engagement of the first tube or pipe than does the other ring; and the sealing rim on the outside surface of the gasket sleeve is dimensioned in such a manner as to offer resistance to its own displacement in the second tube or pipe which is greater than the resistance provided by the rings to displacement of the first tube or pipe inside the gasket.

11. A rapid-action coupling device in combination with and making a sealed connection between two, a first and a second, at least semi-rigid tubes or pipes, the device comprising a gasket of claim 9 disposed coaxially and held in direct contact with and between said tubes or pipes with the free end of the first tube or pipe inserted to a sufficient extent into a free end of the second tube or pipe.

12. A device of claim 11 in further combination with spring blades, fixed on the second tube or pipe, which provide blocking means to oppose involuntary separation of the two tubes or pipes.

13. A device of claim 12 wherein the rings are spaced apart from each other by a distance greater than the diameter of the first tube or pipe;

said rings are shaped and dimensioned so that the ring closer to the annular flange provides greater resistance to engagement of the first tube or pipe than does the other ring; and the sealing rim on the outside surface of the gasket sleeve is dimensioned so as to offer resistance to its own displacement in the second tube or pipe which is greater than the resistance provided by the rings to displacement of the first tube or pipe inside the gasket.

* * * * *